Sept. 22, 1953           S. CHIABERTA           2,652,577
MACHINE FOR PRODUCING ARTICLES FROM BLANK STOCK
Filed Oct. 26, 1950           7 Sheets-Sheet 1
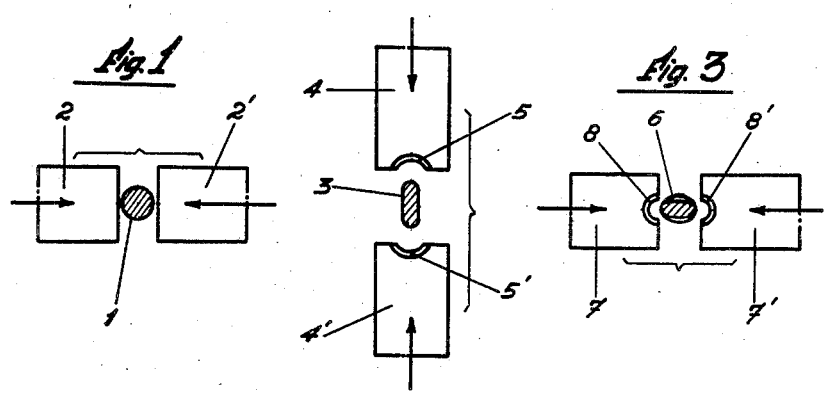
   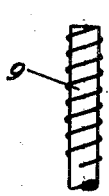 
 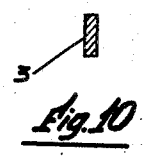  
INVENTOR.
Serafino Chiaberta
BY
Michael Sjs Sept. 22, 1953 S. CHIABERTA 2,652,577
MACHINE FOR PRODUCING ARTICLES FROM BLANK STOCK
Filed Oct. 26, 1950 7 Sheets-Sheet 2
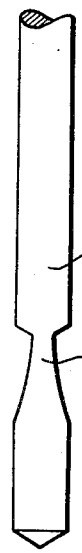
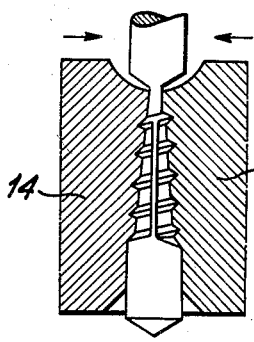
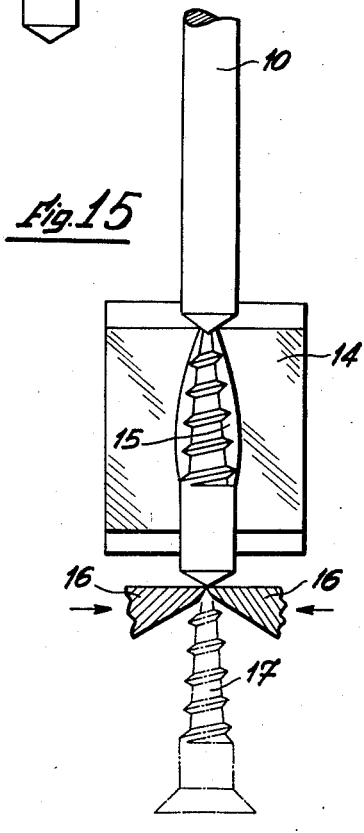
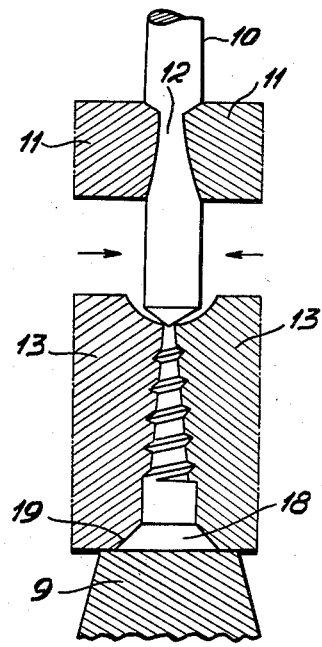
INVENTOR.
Serafino Chiaberta
BY FIG.18.
FIG.17.
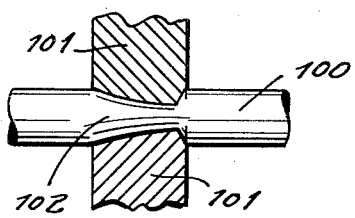
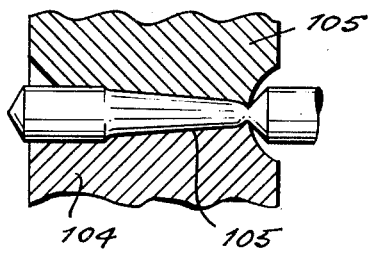
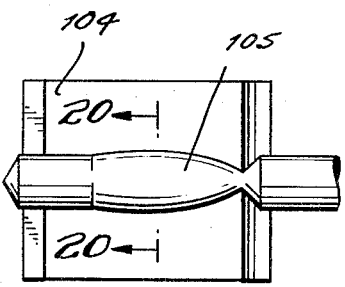
FIG.20.
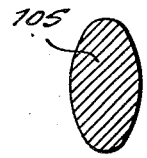
FIG.19.
FIG.21.
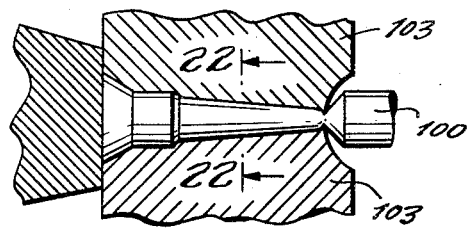
FIG.22.
INVENTOR.
Serafino Chiaberta
BY Sept. 22, 1953  S. CHIABERTA  2,652,577
MACHINE FOR PRODUCING ARTICLES FROM BLANK STOCK
Filed Oct. 26, 1950  7 Sheets-Sheet 4

INVENTOR.
Serafino Chiaberta
BY

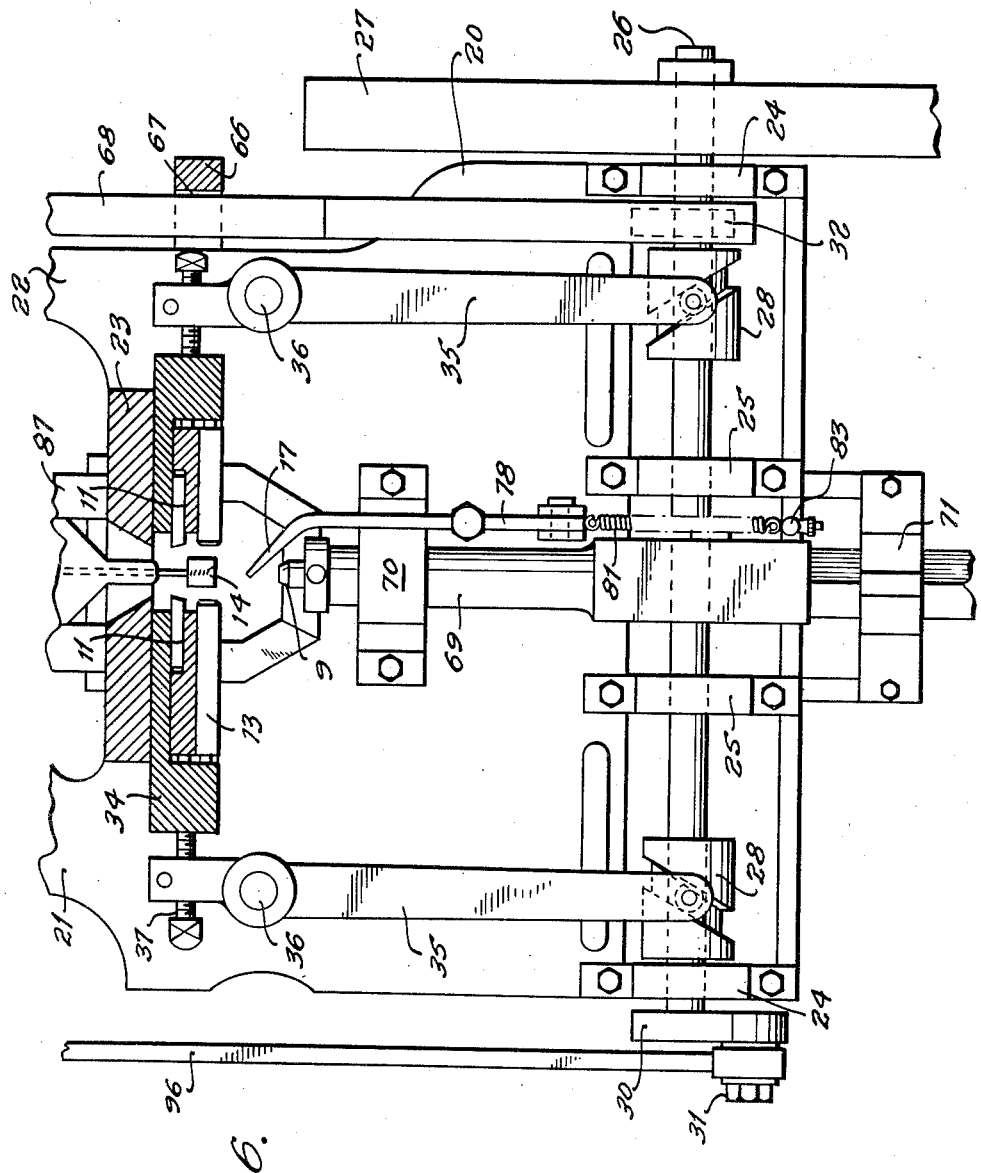

Patented Sept. 22, 1953

2,652,577

UNITED STATES PATENT OFFICE 2,652,577

MACHINE FOR PRODUCING ARTICLES
FROM BLANK STOCK

Serafino Chiaberta, Milan, Italy, assignor to Bulloneria e Viteria Italiana B. E. V. I., Milan, Italy Application October 26, 1950, Serial No. 192,257
In Italy April 27, 1946

10 Claims. (Cl. 10—2)

My present invention relates to a machine for operating dies which work on blank stock so as to produce wood screws or wood screw blanks from the said stock.

This application is a continuation in part of applicant's copending application Serial No. 762,165, filed on July 19, 1947.

One of the objects of my present invention is to shape the stock by means of two pairs of dies which operate in relatively transverse directions so as to first give the stock an elliptical cross section and threads in its outer surface and then to produce the final shape of the wood screw.

An additional object of my present invention is to provide a pair of dies which roughly shape the stock before it is acted upon by the two pairs of dies mentioned in the immediately preceding paragraph.

A further object of my present invention is to provide a further die with means for operating it so that it cooperates with one of the pairs of dies mentioned above to form the head of the wood screw.

A still further object of my present invention is to provide a pair of dies for severing the completed wood screw from the stock.

It sometimes happens that the completed wood screw sticks to the stock after the action of the severing dies, and so an additional object of my present invention is to provide a pivotally mounted member which will break the completed wood screw from the stock if it should stick.

Another object of my present invention is to provide a means for feeding the stock into the machine so that it will be acted on by the dies.

A still further object of my present invention is to provide a series of cams and links driven by a source of power so as to move the above dies in a proper cycle of operations to produce the wood screws.

With the above objects in view my present invention mainly consists of a machine for producing articles from blank stock comprising, in combination, means for pressing the stock between a first pair of dies so that the stock acquires a smaller dimension in the direction in which said first pair of dies act than the dimension of said stock in the direction transverse to the direction in which said first pair of dies act; and means for pressing the stock between a second pair of dies which act in a direction transverse to said smaller dimension of said stock so as to produce the final shape of the article.

More particularly, with the above objects in view, my present invention consists of a machine for producing articles from blank stock comprising, in combination, a horizontally mounted flat support; means for horizontally feeding an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide vertically in the same plane in which said third pair of shaping dies act, and each of the dies of a second pair of shaping dies being fixed to one of said vertically slidable members, respectively; a pair of members pivotally mounted on said support, and each of the dies of a pair of partially severing dies being fixed to one of said pivotally mounted members; an additional member slidably mounted on said support so as to slide horizontally and carrying a shaping die at one end thereof and a spring at the other end thereof mounted so as to urge said additional member toward said third pair of shaping dies; a severing member pivotally mounted on said support and located so that said severing member upon being pivoted will break from the stock the article partially severed by said severing dies; and means for repeatedly effecting a cycle of operations comprising first the operation of said feeding means, then the operation of said vertically slidable and pivotally mounted members, and then the operation of said horizontally slidable members and said severing member, said additional horizontally sliding member being so located with respect to said pair of horizontally sliding members that said die on said additional horizontally sliding member cooperates with said third pair of dies to shape the end of the stock, whereby the shaping and severing dies act on the blank stock to produce a plurality of articles; said means for effecting said cycle of operations comprising a shaft driven so as to rotate about its own axis, a plurality of cams fixedly mounted on said shaft so as to rotate therewith, and a plurality of links connected respectively to said cams and said pairs of members, said cycle being completed during one revolution of said shaft; and said means for feeding said stock comprising a slidably mounted element having an opening through which said stock freely passes, a member pivotally mounted on said element and carrying a stock gripping member arranged at an angle to said stock so as to grip said stock and move it with said element in only one direction of movement of said slidably mounted element, and a linkage connecting said pivotally mounted element and a crank fixedly mounted on said rotating shaft, thereby effecting reciprocating movement of said slidable element to feed the stock into the machine.

The novel features which I consider as characteristic of my invention are set forth in particular in the appended claims. The invention itself, however, both as to its construction and its method of operation, together with additional objects and advantages, will be best understood from the following description of specific embodiments when read in connection with the accompanying drawings, in which:

Figure 1 is a view of one type of a pair of dies which are adapted to act on the blank stock;

Figure 2 is a view of a second pair of dies adapted to be associated with the dies shown in Fig. 1 and to act on the stock shaped by the dies of Fig. 1;

Figure 3 is a view of a third pair of dies which cooperate with the dies of Figs. 1 and 2 to produce a wood screw;

Figures 4 to 8 are elevation views of lengths of stock during various stages of operations by the dies of Figs. 1 to 3, and will be more fully discussed below;

Figures 9 to 12 are cross sectional views of the stock shown in elevation in Figs. 4 to 7, respectively;

Figure 13 is a view of length of stock adapted to be acted on by a slightly modified set of dies;

Figure 14 is a view of dies similar to those of Figs. 1 to 3;

Figure 15 is a plan view of one of the dies shown in Fig. 14 with the stock located therein and also shows a view of the severing dies;

Figure 16 is a view of dies similar to those of Figs. 1 to 3 and shows an additional die member adapted to cooperate with other dies to form the head of the wood screw;

Figure 17 is a view of a modified set of dies used in the formation of wood screw blanks;

Figure 18 is a view of an additional pair of dies used in the process of forming wood screw blanks;

Figure 19 is a plan view of one of the dies shown in Fig. 18 with the stock located therein;

Figure 20 is a cross sectional view of the stock after it has been shaped by the dies shown in Fig. 18;

Figure 21 is a view of the finishing dies for the making of blank wood screws;

Figure 22 is a cross sectional view of the wood screw blank after it is shaped by the dies of Fig. 21;

Figure 26 is a plan view of the machine with parts which are unnecessary in the making of blank wood screws removed therefrom.

Figure 23:
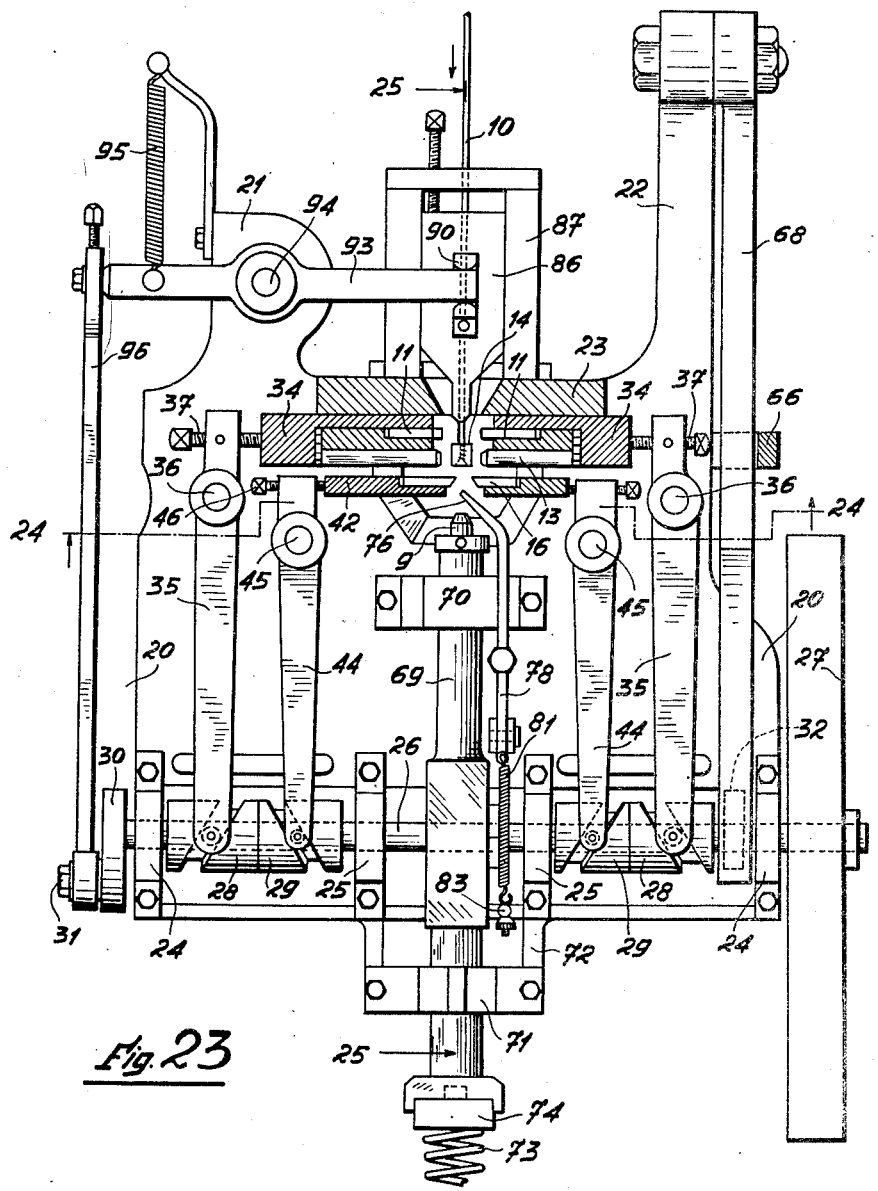
Figure 23 is a plan view of the machine for operating the dies.
Figure 24:
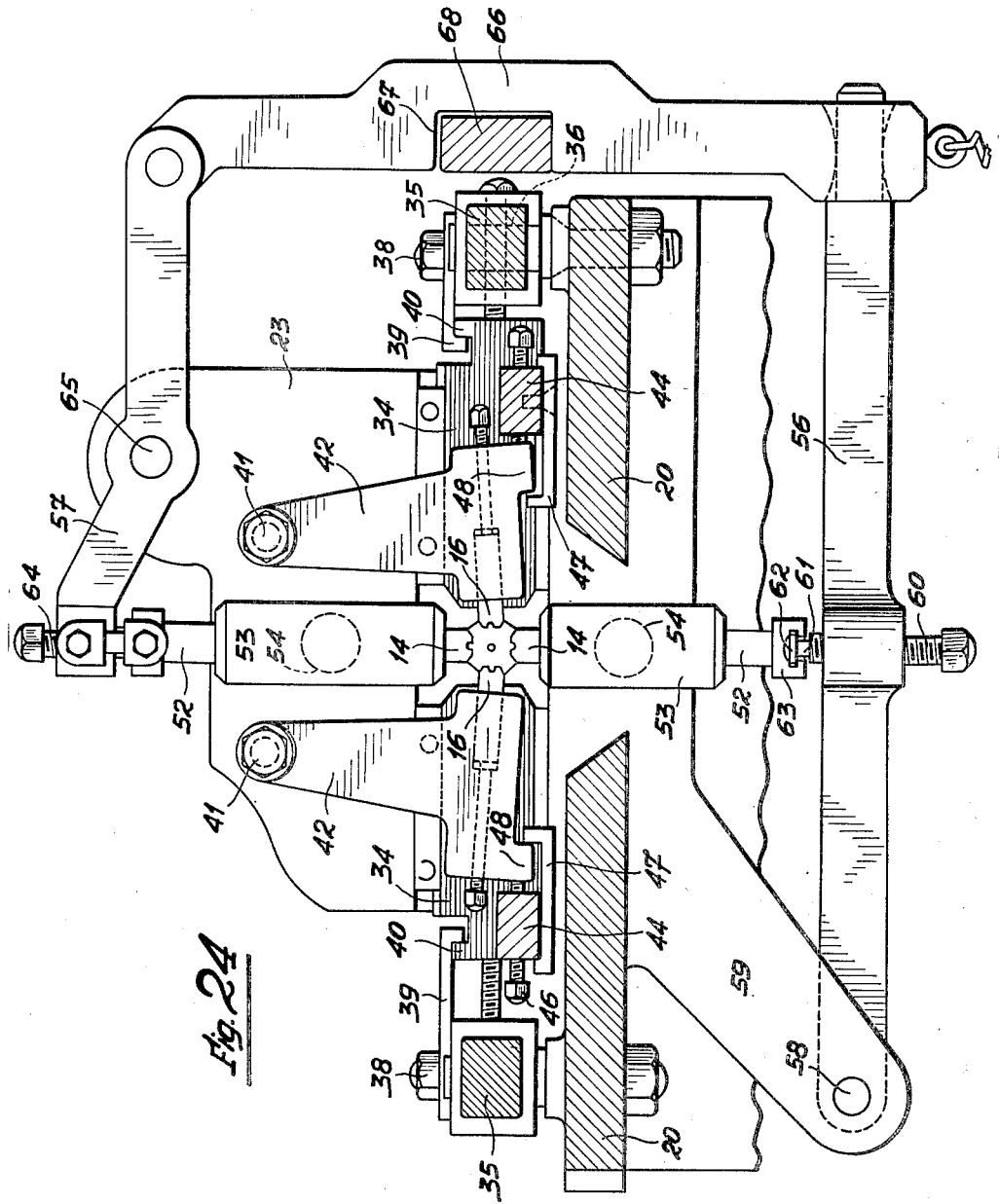
Figure 24 is a sectional elevation view of the machine for operating the dies taken on the line 24—24 and looking in the direction of the arrows.

The machine of my present invention is adapted to operate various sets of dies for producing different types of wood screws or for producing wood screw blanks.

In Figs. 1 to 3 are shown one group of dies which are adapted to produce a wood screw as shown in Fig. 8. As shown in Fig. 1, the stock 1 is acted upon by the dies 2—2' to give the stock a somewhat rectangular cross section as shown in Fig. 10. The rectangular section 3 thereby produced is then acted upon by the dies 4—4' which include the thread forming elements 5—5', respectively, as shown in Fig. 2, to produce a section of stock of elliptical cross section 6, as shown in Figs. 3 and 11. This stock is then acted upon by the dies 7—7' comprising the element 8—8', respectively, to produce the final wood screw 9, as shown in Figs. 7 and 12. Figs. 4 and 9, respectively, show elevational and cross sectional views of the blank stock. Figs. 5 and 10, respectively, show elevational and cross sectional views of the stock after it has been acted upon by the dies 2—2'. Figs. 6 and 11, respectively, show elevational and cross sectional views of the stock after it has been acted upon by the dies 4—4'. Figs. 7 and 12 show, respectively, elevational and cross sectional views of the stock after it has been acted upon by the dies 7—7', and Fig. 8 shows the completed wood screw having a head produced by any known means or by the means to be described below.

In Fig. 13 there is shown a length of stock 10 after it has been acted upon by the dies 11, shown in Fig. 16, which produce the section 12 in the stock 10, the said section 12 being of a conical cross section. The dies 14 are then actuated by the machine to be described below so that they act upon the section 12 to produce threads therein, as shown in Figs. 14 and 15, and these dies 14 also produce the fins 15. After the dies 14 are withdrawn from the stock, the dies 13, shown in Fig. 16, then act on the stock to produce the final shape of the threads and to remove the fins 15. The dies 13 include dished-portions 19 with which a die 9 cooperates to produce the head 18 of the wood screw, as shown in Fig. 16. After the stock has been advanced, the die 16 acts upon it as shown in Fig. 15, to sever the completed wood screw 17.

The machine of my invention is also adapted to have a different set of dies attached thereto to produce blanks from which screws can be made, as shown in Figs. 17 through 22. In Fig. 17 is shown a set of dies 101 which produce a roughly flattened shape 102 in the stock. In Fig. 18 the dies 104 are shown acting upon the stock 100, and the section 102 which is produced by the dies 101, to produce an elliptical shape 105 in the stock, as shown in Fig. 20. It will be noted that the decrease in the diameter of the material produced by dies 104 is compensated for by an increase in the length of the section 102. In Fig. 21 is shown a set of dies 103 which produce the final shape on the blank screw and which comprise dished portions with which die member 9 cooperates to produce the head of the screw, as was discussed in connection with Fig. 16. A cross section of the screw produced by dies 103 is shown in Fig. 22. The dies 103 are so shaped that in addition to producing the final shape of the blank screw they also sever the screw from the stock 100.

The machine on which the above described dies are adapted to be mounted comprises a table 20 having horizontal extensions 21 and 22 and having a vertical extension 23. The table is provided with two bearings 24 and two bearings 25, and mounted in these bearings is an operating shaft 26 upon which is mounted a pulley 27 by which it may be driven.

The shaft 26 is provided with a pair of cams 28 and a second pair of cams 29, and it is further provided at one end with a crank 30 having a crank pin 31. Further cams 32 and 33 are also mounted on the shaft.

Mounted on the upwardly-projecting portion 23 of the table are two slides 34, these slides carrying the dies 11, and the dies 13 are moved inwardly and outwardly in relation to the stock 10. These slides may be provided with dovetail-section tongue and groove engagement with the part 23 of the table. These slides are operated by levers 35 pivoted at 36 to the table and operated by the cams 28. Each lever is provided with an adjustment screw 37 which bears on the end of the slide, and attached to each lever by a bolt 38 is a hook 39 which engages a lug 40 at the end of the slide, so that when the levers oscillate the slides are reciprocated, the outward movement being produced by the hooks 39.

The actual dies 11 and 13 are detachably mounted in the slide by any suitable means.

Pivoted at 41 to the portion 23 of the table are two levers 42. These levers carry the severing dies 16, and the levers are actuated by the levers 44, which are pivoted at 45 to the table and are oscillated by the cams 29.

The levers 44 are provided with screws 46 which bear on the ends of the levers 42, and the levers 44 are further provided with hooks 47 which engage lugs 48 on the levers 42 to produce the outward movement. The levers 44 impart oscillating movement to the levers 42. The actual severing dies 16 are fixed in the levers 42 by any suitable means. The upper and lower vertically-moving dies 14 are provided with stems 52 which can slide through bearings 53. These bearings are provided with laterally-projecting trunnions 54 which are secured in the part 23 of the table by screws 55. These vertically-moving dies are operated by levers 56 and 57.

The lever 56 is pivoted at 58 to an arm 59 on the table, and it is provided with a screw 60 having a reduced neck 61 on a head 62 which engages a recess in a member 63 on the end of the stem 52 of the lower die 14.

The lever 57 is similarly provided with a screw 64 and is similarly connected to the upper end of the stem 52 of the upper die 14. The lever 57 is pivoted at 65 to the part 23 of the table, and the levers 57 and 56 are connected together by a link 66 having a rectangular recess 67 which engages around a lever 68. This lever (see Figure 23) is oscillated by the cam 32, and its oscillations cause the levers 56 and 57 to be oscillated so that the upper and lower dies 14 move inwardly towards the axis of the stock simultaneously, and also move outwardly simultaneously.

The heading die 9 is mounted in the end of a horizontally reciprocating bar 69. This bar reciprocates in bearings 70, 71 the bearing 70 being on the table and the bearing 71 being mounted on a pair of brackets 72 formed on or connected to the table. One end of the bar is of non-circular shape in cross section, and the bearing 71 is of similar shape. The bar 69 is spring-loaded towards the end of the stock, the spring being shown at 73 and operating between an abutment 74 at the end of the bar and another abutment (not shown) which may be connected to the table.

The bar 69 is provided with a downwardly-projecting lug 75 engaged by the cam 33 on the operating shaft 26. The cam operates to withdraw the bar from the end of the stock against the pressure of the spring, and in suitably timed relationship to the movements of the dies the cam releases the lug 75 and the bar moves with a snap action and strikes a blow on the end of the stock so as to form the head 18.

After the severing dies 16 have operated, the completed screw, indicated at 17, sometimes adheres to the end of the stock, and for this reason a knocking-off device 76 may be provided. This device strikes a blow against the completed screw, the blow being of sufficient force to detach it from the stock. The knocking-off device 76 is secured by a clip 77 to a bellcrank lever 78 having an arm 79 which is actuated by a cam 80 on the shaft 26. The lever 78 is acted upon by a tension spring 81 connected to an adjustable pin 82 mounted in an upwardly-projecting post 83 on the table and adjustable by means of a nut 84. The arm 79 of the lever 78 is provided with a screw 85 which forms an adjustable stop by coming into contact with the table. This stop limits the movement of the knocking-off device 76 away from the axis of the stock.

After each screw has been severed and the dies have all been moved away from the stock, the stock is advanced by a length equal to the length of a screw, and this is accomplished by a feed slide 86. This feed slide is mounted to operate in a frame 87 attached to the part 23 of the table, the slide being guided in this frame. The slide is provided on its upper side with an opening 88 in which is pivoted at 89 a rocking member 90. This rocking member carries a blade 91 the edge of which bears on the stock (see Figure 25). Opposite to the edge of the blade 91 the slide is provided with an insert 92. The slide is operated by means of a lever 93 pivoted at 94 to the extension 21 of the table, the second arm of the lever being acted upon by a spring 95 and the lever being oscillated by a rod 96 to which motion is applied by the crank pin 31.

Figure 25:
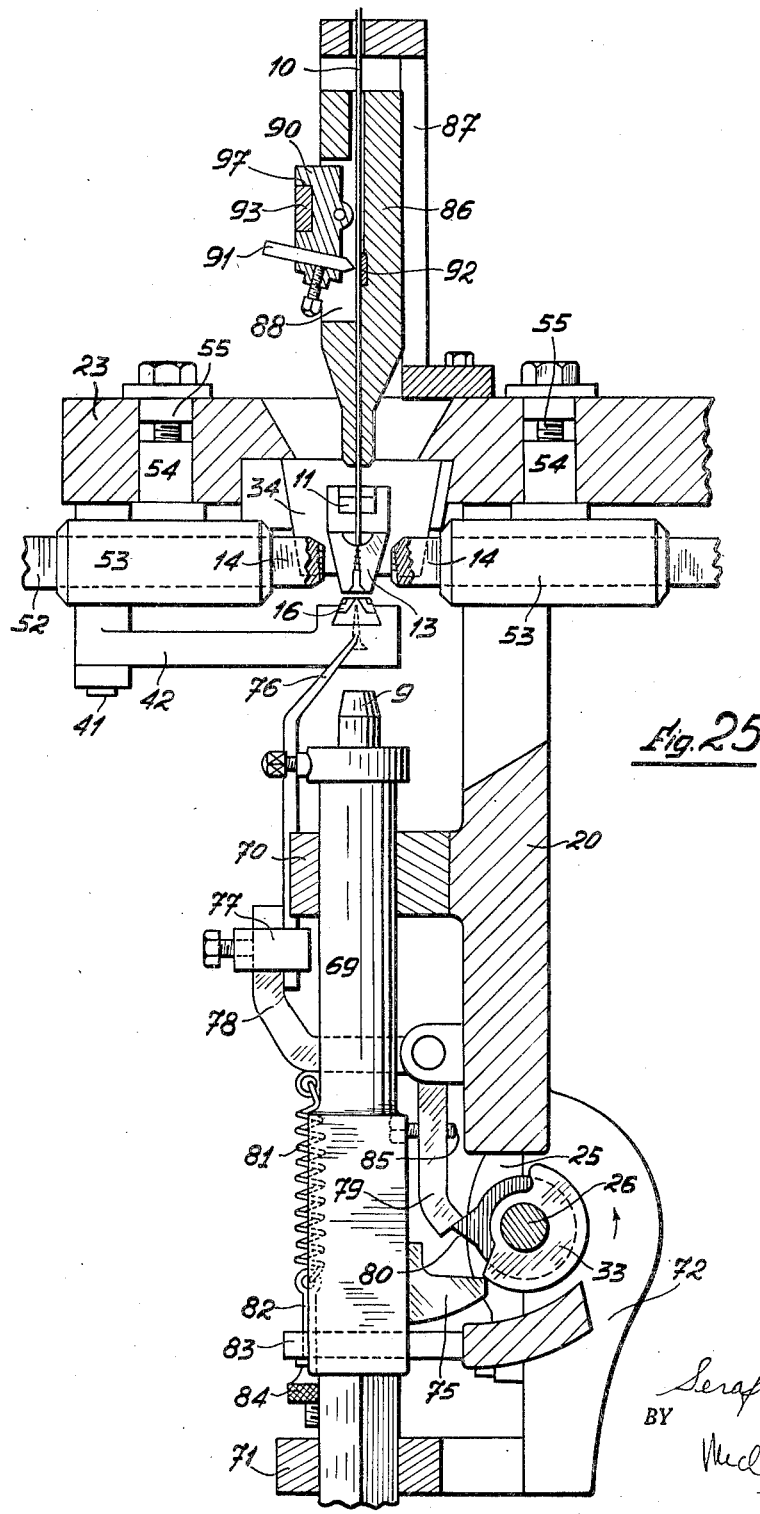
Figure 25 is a sectional elevation view of the machine for operating the dies taken on the line 25—25 of Fig. 23 and looking in the direction of the arrows.

The lever 93 engages in a slot 97 in the rocking member 90, and the blade 91 is inclined to a plane which is transverse to the stock 10, so that when the slide 86 and blade 91 are moving to the right, as seen in Figure 25, the stock is moved in an endwise direction. On the return movement however the lower end of the blade slides over the stock and the stock remains stationary.

As illustrated, the machine is designed to operate upon stock of round section. It is however possible to use stock of elliptical or other sectional shape of elongated form, in which case the dies 11 may be omitted as it will be unnecessary to deform the sectional shape of the stock locally.

Alternatively, stock of round section may be used and it may be passed between pressure rollers which convert it into elliptical or other section of elongated form, and if this is done the dies 11 are unnecessary.

The machine as shown in Fig. 26 has the parts 29, 44, 45, 42 and 16 removed because the machine shown in Fig. 26 is used for making blanks for wood screws, and, as was described above, the dies 103 themselves perform the severing operation simultaneously with the final shaping operation so that the dies 16 and their operating mechanism are no longer needed.

The operation of the machine is as follows:

A motor drives the pulley 27 and thereby continually rotates the shaft 26 to which the various cams described above are fixedly attached. Assuming that the feeding means has just advanced the stock by a distance regulated by the oscillation of lever 93, the cams on shaft 26 are so arranged that cam 32 then oscillates lever 68 so as to bring dies 14 against the stock which has previously been shaped by dies 11 so as to shape the stock in the manner shown in Fig. 15. Simultaneously therewith, the cams 29 oscillate the levers 24 to bring together the severing dies 16 so as to sever the completed screw which has been advanced into position to be severed by the feeding means; that is, a completed screw is in position to be severed at the start of the operations described. After the continued rotation of cams 32 and 29 cause the dies 14 and 16, respectively, to be withdrawn from the stock, the cams 28 operate the links 35 so as to bring the dies 11 and 13 into position to act on the stock as shown in Fig. 16. At this point, the dies 11 produce the conical shape 12 in the blank stock and the dies 13 finish the wood screw, as shown in Fig. 16. Simultaneously with the movement of dies 11 and 13, cam 33 releases element 69 and die member 9 so that under the force of spring 73 die member 9 is forced against die members 13 to produce the head of the screw 18, as shown in Fig. 16 and described above. The continued rotation of the shaft 26 causes the cams 28 and 33 to withdraw the dies 11, 13 and 9, and the crank 30 is so positioned on the shaft 26 that the link 96 pivots lever 93 so as to move element 86 towards the machine at this point and thereby advance the stock into the machine. At this time, the cycle of operations has been complete, and dies 14 and the severing dies 16 again come into action as described above. All of the above cycle of operations takes place during one revolution of shaft 26. As was mentioned above the dies 16 sometimes fail to completely sever the completed screw from the stock, and if this should happen element 76 fixed to the lever 78, which is actuated by cam 80, breaks the completed screw from the stock, as shown in Fig. 25.

The machine for the making of wood screw blanks, shown in Fig. 26, operates in the manner described above, the only difference being that when the dies 104 move vertically to provide the intermediate shape, as shown in Figs. 18 and 19, there are no severing dies which move simultaneously therewith. As has been mentioned above, the severing dies 16 and their operating structure have been removed since the dies 103 serve both as severing and final shaping dies. With this exception the operation of the machine shown in Fig. 26 is identical with that of the machine shown in Fig. 23.

It will be understood that the elements of the apparatus described above or parts thereof may find useful application in making devices of types other than those described.

While I have illustrated and described the invention as embodied in an apparatus for making wood screw and blank wood screws, I do not intend to be limited to the details shown, since various modifications and structural changes may be made without departing from the spirit of my invention.

Without further analysis the foregoing will so fully reveal the gist of my invention that others can by applying current knowledge readily adapt it for various applications without omitting features that, from the standpoint of the prior art, fairly constitute the essential characteristics of the generic or specific aspects of this invention, and, therefore, such adaptations should and are intended to be comprehended within the meaning and range of equivalents of the following claims.

What I claim as new and desire to secure by Letters Patent is:

1. A machine for producing articles from blank stock comprising, in combination, a horizontally mounted flat support; feeding means associated with said support for horizontally feeding over the latter an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically, and each of the dies of a second pair of shaping dies being fixed to one of said vertically slidable members, respectively, said second pair of shaping dies being located in a vertical plane which includes said third pair of shaping dies; a pair of members pivotally mounted on said support, and each of the dies of a pair of severing dies being fixed to one of said pivotally mounted members; lever means operatively connected to all of said members; cam means operatively connected to said lever means to move the same to actuate said first and third pairs of dies alternately with said second and severing pairs of dies; and drive means operatively connected to said cam means for driving the same.

2. A machine for producing articles from blank stock comprising, in combination, a horizontally mounted flat support; feeding means associated with said support for horizontally feeding over said support an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically in the same plane in which said third pair of shaping dies act, and each of the dies of a second pair of shaping dies being located in said plane and fixed to one of said vertically slidable members, respectively; a pair of members pivotally mounted on said support, and each of the dies of a pair of severing dies being fixed to one of said pivotally mounted members; and moving means operatively connected to said feeding means and all of said pairs of members for intermittently actuating said feeding means and for actuating said members between the intermittent actuations of said feeding means.

3. A machine for producing articles from blank stock comprising, in combination, a horizontally mounted flat support; feeding means associated with said support for horizontally feeding over the same an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically in the same plane in which said third pair of dies act, and each of the dies of a second pair of shaping dies being fixed to one of said vertically slidable members, respectively; a pair of members pivotally mounted on said support, and each of the dies of a pair of severing dies being fixed to one of said pivotally mounted members; and means for repeatedly effecting a cycle of operations comprising first the operation of said feeding means, then the operation of said vertically slidable and pivotally mounted members, and then the operation of said horizontally slidable members, whereby the shaping and severing dies act on the blank stock to produce a plurality of articles, said means for effecting said cycle of operations comprising a shaft driven so as to rotate about its own axis, a plurality of cams fixedly mounted on said shaft so as to rotate therewith, and a plurality of links connected respectively to said cams and said pairs of members.

4. A machine for producing articles from blank stock comprising, in combination, a horizontally mounted flat support; means for horizontally feeding an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically in the same plane in which said third pair of dies act, and each of the dies of a second pair of shaping dies being fixed to one of said vertically slidable members, respectively; a pair of members pivotally mounted on said support, and each of the dies of a pair of severing dies being fixed to one of said pivotally mounted members; and means for repeatedly effecting a cycle of operations comprising first the operation of said feeding means, then the operation of said vertically slidable and pivotally mounted members, and then the operation of said horizontally slidable members, whereby the shaping and severing dies act on the blank stock to produce a plurality of articles, said means for effecting said cycle of operations comprising a shaft driven so as to rotate about its own axis, a plurality of cams fixedly mounted on said shaft so as to rotate therewith, and a plurality of links connected respectively to said cams and said pairs of members; and said means for feeding said stock comprising a slidably mounted element having an opening through which said stock freely passes, a member pivotally mounted on said element and carrying a stock gripping member arranged at an angle to said stock so as to grip said stock and move it with said slidably mounted element in only one direction of movement of said slidably mounted element, and a linkage connecting said pivotally mounted member and a crank fixedly mounted on said rotating shaft thereby effecting reciprocating movement of said slidably mounted element to feed the stock into the machine.

5. A machine for producing articles from blank stock comprising, in combination, a horizontally mounted flat support; means for horizontally feeding along a predetermined line an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically in the same plane in which said third pair of dies act, and each of the dies of a second pair of shaping dies being fixed to one of said vertically slidable members, respectively; a pair of members pivotally mounted on said support, and each of the dies of a pair of severing dies being fixed to one of said pivotally mounted members; an additional member located on the opposite side of said third pair of dies from said first pair of dies and being mounted on said support for horizontal sliding movement along said predetermined line toward and away from said third pair of dies, said additional member carrying at a free end thereof adjacent said third pair of dies a shaping die cooperating with said third pair of dies to shape the end of the stock when said additional member moves toward said third pair of dies; and means for intermittently operating said feeding means and for operating, between the intermittent operations of said feeding means, said additional member, said first pair of dies, and said third pair of dies alternately with said second and severing pairs of dies.

6. A machine for producing articles from blank stock comprising, in combination, a horizontally mounted flat support; means for horizontally feeding an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically, and each of the dies of a second pair of shaping dies being located in a vertical plane which includes said third pair of dies and fixed to one of said vertically slidable members, respectively; a pair of members pivotally mounted on said support, and each of the dies of a pair of severing dies being fixed to one of said pivotally mounted members; an additional member slidably mounted on said support so as to slide horizontally and carrying a shaping die at one end thereof; said additional horizontally sliding member being so located with respect to said pair of horizontally sliding members that said die on said additional horizontally sliding member cooperates with said third pair of dies to shape the end of the stock; and means for intermittently operating said feeding means and for operating, between the intermittent operations of said feeding means, said additional member, said first pair of dies, and said third pair of dies alternately with said second and severing pairs of dies.

7. A machine for producing articles from blank stock comprising, in combination, a horizontally mounted flat support; means for horizontally feeding an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically in the same plane in which said third pair of dies act, and each of the dies of a second pair of shaping dies being fixed to one of said vertically slidable members, respectively; a pair of members pivotally mounted on said support, and each of the dies of a pair of partially severing dies being fixed to one of said pivotally mounted members; a breaking member pivotally mounted on said support and located so that the said member upon being pivoted will break from the stock the article partially severed by said severing dies; and means for intermittently operating said breaking member and said feeding means and for operating, between the intermittent operations of said breaking member and feeding means, said first and third pair of dies alternately with said second and severing pairs of dies.

8. A machine for producing articles from blank stock comprising, in combination, a horizontally mounted flat support; means for horizontally feeding an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically in the same plane in which said third pair of dies act, and each of the dies of a second pair of shaping dies being fixed to one of said vertically slidable members, respectively; a pair of members pivotally mounted on said support, and each of the dies of a pair of severing dies being fixed to one of said pivotally mounted members; an additional member slidably mounted on said support so as to slide horizontally and carrying a shaping die at one end thereof and a spring at the other end thereof mounted so as to urge said additional member towards said third pair of shaping dies, said additional horizontally sliding member being so located with respect to said pair of horizontally sliding members that said die on said additional horizontally sliding member cooperates with said third pair of dies to shape the end of the stock; and means for intermittently operating said feeding means and for operating, between the intermittent operations of said feeding means, said additional member, said first pair of dies, and said third pair of dies alternately with said second and severing pairs of dies.

9. A machine for producing articles from blank stock comprising, in combination, a horizontally mounted flat support; means for horizontally feeding an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically in the same plane in which said third pair of dies act, and each of the dies of a second pair of shaping dies being fixed to one of said vertically slidable members, respectively; a pair of members pivotally mounted on said support, and each of the dies of a pair of severing dies being fixed to one of said pivotally mounted members; and means for repeatedly effecting a cycle of operations comprising first the operation of said feeding means, then the operation of said vertically slidable and pivotally mounted members, and then the operation of said horizontally slidable members, whereby the shaping and severing dies act on the blank stock to produce a plurality of articles, said means for effecting said cycle of operations comprising a shaft driven so as to rotate about its own axis, a plurality of cams fixedly mounted on said shaft so as to rotate therewith, and a plurality of links connected respectively to said cams and said pairs of members, said cycle being completed during one revolution of said shaft.

10. A machine for producing articles from blank stock comprising, in combination, a horizontally mounted flat support; means for horizontally feeding an elongated length of stock supported at a position adjacent to but spaced from said support; a pair of members to which a first and third pair of shaping dies are fixed, one of the dies of each pair being fixed at spaced points to one of said members, respectively, and said members being slidably mounted on said support so as to slide horizontally; a pair of members slidably mounted on said support so as to slide vertically in the same plane in which said third pair of shaping dies act, and each of the dies of a second pair of shaping dies being fixed to one of said vertically slidable members, respectively; a pair of members pivotally mounted on said support, and each of the dies of a pair of partially severing dies being fixed to one of said pivotally mounted members; an additional member slidably mounted on said support so as to slide horizontally and carrying a shaping die at one end thereof and a spring at the other end thereof mounted so as to urge said additional member toward said third pair of shaping dies; a breaking member pivotally mounted on said support and located so that said breaking member upon being pivoted will break from the stock the article already partially severed by said severing dies; and means for repeatedly effecting a cycle of operations comprising first the operation of said feeding means, then the operation of said vertically slidable and pivotally mounted members, and then the operation of said horizontally slidable members and said partially severing dies, said additional horizontally sliding member being so located with respect to said pair of horizontally sliding members that said die on said additional horizontally sliding member cooperates with said third pair of dies to shape the end of the stock, whereby the shaping and severing dies act on the blank stock to produce a plurality of articles, said means for effecting said cycle of operations comprising a shaft driven so as to rotate about its own axis, a plurality of cams fixedly mounted on said shaft so as to rotate therewith, one of said cams being operatively connected to said breaking member to pivot the same, and a plurality of links connected respectively to all except said one of said cams and to said pairs of members, said cycle being completed during one revolution of said shaft, and said means for feeding said stock comprising a slidably mounted element having an opening through which said stock freely passes, a member pivotally mounted on said element and carrying a stock gripping member arranged at an angle to said stock so as to grip said stock and move it with said element in only one direction of movement of said slidably mounted element, and a linkage connecting said pivotally mounted element and a crank fixedly mounted on said rotating shaft, thereby effecting reciprocating movement of said slidable element to feed the stock into the machine.

SERAFINO CHIABERTA.

References Cited in the file of this patent

UNITED STATES PATENTS

| Number | Name | Date |
| --- | --- | --- |
| 168,135 | Burdict | Sept. 28, 1875 |
| 442,987 | Moore | Dec. 16, 1890 |
| 986,697 | Deeds | Mar. 14, 1911 |
| 1,535,553 | Stamback | Apr. 28, 1925 |

FOREIGN PATENTS

| Number | Country | Date |
| --- | --- | --- |
| 164,597 | Austria | Apr. 15, 1949 |